United States Patent
Henke et al.

(10) Patent No.: US 9,469,091 B2
(45) Date of Patent: Oct. 18, 2016

(54) METHOD OF MAKING EXTENSIBLE WEB LAMINATES

(75) Inventors: Mary Beth Henke, Woodbury, MN (US); Rebecca A. Shipman, Woodbury, MN (US); Gerald S. Deeb, Mendota Heights, MN (US); Kent R. Schoenherr, Stillwater, MN (US); Todd L. Nelson, Eau Claire, WI (US); William H. Sikorski, Jr., White Bear Lake, MN (US); Vathsala Rajagopal, Woodbury, MN (US); Thomas P. Hanschen, Mendota Heights, MN (US); Mark A. Peltier, Forest Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/569,563

(22) Filed: Aug. 8, 2012

(65) Prior Publication Data
US 2014/0041786 A1 Feb. 13, 2014

(51) Int. Cl.
*B32B 38/00* (2006.01)
*B32B 37/14* (2006.01)

(52) U.S. Cl.
CPC ...... *B32B 37/144* (2013.01); *B32B 2038/0028* (2013.01); *B32B 2307/51* (2013.01); *B32B 2555/02* (2013.01)

(58) Field of Classification Search
CPC .................. B32B 2038/0028; B32B 2555/02
USPC ........ 156/160, 163, 164, 229, 494, 495, 496
See application file for complete search history.

(56) References Cited

U.S. PATENT DOCUMENTS

| | | |
|---|---|---|
| 1,732,968 A | 10/1929 | Dwight |
| 2,158,087 A | 5/1939 | Wallace et al. |
| 3,220,056 A | 11/1965 | Walton |
| 3,233,029 A | 2/1966 | Ole-Bendt |
| 3,265,765 A | 8/1966 | Holden et al. |
| 3,338,992 A | 8/1967 | Kinney |
| 3,341,394 A | 9/1967 | Kinney |
| 3,466,358 A | 9/1969 | Muller |
| 3,502,763 A | 3/1970 | Hartmanm |
| 3,528,145 A | 9/1970 | Troope et al. |
| 3,542,615 A | 11/1970 | Dobo et al. |
| 3,562,356 A | 2/1971 | Nyberg et al. |
| 3,624,874 A | 12/1971 | Lauchenauer |

(Continued)

FOREIGN PATENT DOCUMENTS

| | | |
|---|---|---|
| DE | 2503775 A1 | 8/1976 |
| EP | 0 685 586 A2 | 12/1994 |

(Continued)

*Primary Examiner* — Carson Gross (57) ABSTRACT

A method of making extensible web laminates comprising a multilayer film and at least one web layer and the use of such extensible web laminates in personal care articles. The method generally includes activating the multilayer film in a first direction by stretching at least a portion of the multilayer film past the elastic deformation limit of the skin layers and recovering the skin layers with the elastomeric core layer to produce a multilayer film that is elastic in the first direction. The activated multilayer film is subsequently stretched beyond the deformation limit of the skin layers in a second direction substantially perpendicular to the first direction. At least one web layer is applied to the multilayer film while in the stretched state. The multilayer film is then recovered to produce an extensible web laminate.

26 Claims, 5 Drawing Sheets

(56) References Cited

U.S. PATENT DOCUMENTS

| | | |
|---|---|---|
| 3,692,618 A | 9/1972 | Dorschner et al. |
| 3,700,633 A | 10/1972 | Wald et al. |
| 3,844,869 A | 10/1974 | Rust, Jr. |
| 3,849,526 A | 11/1974 | Muller et al. |
| 4,087,226 A | 5/1978 | Mercer |
| 4,116,892 A | 9/1978 | Schwarz |
| 4,116,917 A | 9/1978 | Eckert |
| 4,144,008 A | 3/1979 | Schwarz |
| 4,153,664 A | 5/1979 | Sabee |
| 4,156,673 A | 5/1979 | Eckert |
| 4,209,563 A | 6/1980 | Sisson |
| 4,223,059 A | 9/1980 | Schwarz |
| 4,223,063 A | 9/1980 | Sabee |
| 4,251,585 A | 2/1981 | Schwarz |
| 4,259,399 A | 3/1981 | Hill |
| 4,336,638 A | 6/1982 | Mercer |
| 4,340,563 A | 7/1982 | Appel et al. |
| 4,368,565 A | 1/1983 | Schwarz |
| 4,374,690 A | 2/1983 | Canterino et al. |
| 4,400,227 A | 8/1983 | Riemersma |
| 4,404,052 A | 9/1983 | Persson et al. |
| 4,464,815 A | 8/1984 | Canterino et al. |
| 4,475,971 A | 10/1984 | Canterino |
| 4,517,714 A | 5/1985 | Sneed et al. |
| 556,501 A | 3/1986 | Goddu |
| 4,618,384 A | 10/1986 | Sabee |
| 4,781,962 A | 11/1988 | Zamarripa et al. |
| 4,834,741 A | 5/1989 | Sabee |
| 4,842,596 A | 6/1989 | Kielpikowski et al. |
| 4,847,134 A * | 7/1989 | Fahrenkrug et al. ......... 428/138 |
| 4,968,313 A | 11/1990 | Sabee |
| 5,043,036 A * | 8/1991 | Swenson ...................... 156/160 |
| 5,096,532 A | 3/1992 | Neuwirth et al. |
| 5,110,403 A | 5/1992 | Ehlert |
| 5,114,781 A | 5/1992 | Morman |
| 5,143,679 A | 9/1992 | Weber et al. |
| 5,151,092 A | 9/1992 | Buell et al. |
| 5,156,793 A | 10/1992 | Buell et al. |
| 5,167,897 A | 12/1992 | Weber et al. |
| 5,196,000 A | 3/1993 | Clear et al. |
| 5,196,247 A | 3/1993 | Wu et al. |
| 5,221,274 A | 6/1993 | Buell et al. |
| 5,344,691 A | 9/1994 | Hanschen et al. |
| 5,354,597 A * | 10/1994 | Capik et al. ................. 428/152 |
| 5,366,782 A | 11/1994 | Curro et al. |
| 5,422,172 A | 6/1995 | Wu |
| 5,429,856 A | 7/1995 | Krueger et al. |
| 5,462,708 A | 10/1995 | Swenson et al. |
| 5,501,679 A | 3/1996 | Krueger et al. |
| 5,527,304 A | 6/1996 | Buell et al. |
| 5,567,501 A | 10/1996 | Srinivasan et al. |
| 5,620,780 A | 4/1997 | Krueger et al. |
| 5,674,216 A | 10/1997 | Buell et al. |
| 5,773,374 A | 6/1998 | Wood et al. |
| 5,800,903 A | 9/1998 | Wood et al. |
| 5,817,199 A | 10/1998 | Brennecke et al. |
| 5,840,412 A | 11/1998 | Wood et al. |
| 5,851,935 A | 12/1998 | Srinivasan et al. |
| 5,861,074 A | 1/1999 | Wu |
| 5,882,769 A | 3/1999 | McCormack et al. |
| 6,030,372 A | 2/2000 | Buell et al. |
| 6,057,024 A | 5/2000 | Mleziva et al. |
| 6,217,563 B1 | 4/2001 | Van Gompel et al. |
| 6,375,646 B1 | 4/2002 | Widlund et al. |
| 6,461,457 B1 | 10/2002 | Taylor et al. |
| 6,472,084 B1 | 10/2002 | Middlesworth et al. |
| 6,476,289 B1 | 11/2002 | Buell et al. |
| 6,572,595 B1 | 6/2003 | Klemp et al. |
| 6,716,498 B2 | 4/2004 | Curro et al. |
| 6,730,622 B2 | 5/2004 | Curro et al. |
| 6,808,791 B2 | 10/2004 | Curro et al. |
| 6,811,643 B2 | 11/2004 | Mcamish et al. |
| 6,830,800 B2 | 12/2004 | Curro et al. |
| 6,863,960 B2 | 3/2005 | Curro et al. |
| 6,878,433 B2 | 4/2005 | Curro et al. |
| 6,884,494 B1 | 4/2005 | Curro et al. |
| 6,949,283 B2 | 9/2005 | Kollaja et al. |
| 6,974,514 B2 | 12/2005 | Hamulski et al. |
| 6,986,932 B2 | 1/2006 | Zink et al. |
| 6,994,761 B2 | 2/2006 | Klemp et al. |
| 7,037,569 B2 | 5/2006 | Curro et al. |
| 7,083,691 B2 | 8/2006 | Hamulski et al. |
| 7,087,289 B2 | 8/2006 | Soon et al. |
| 7,220,332 B2 | 5/2007 | Curro et al. |
| 7,320,948 B2 | 1/2008 | Morman et al. |
| 7,749,211 B2 | 7/2010 | Van Gompel et al. |
| 7,803,244 B2 | 9/2010 | Siqueira et al. |
| 7,893,159 B2 | 2/2011 | Chang |
| 7,897,078 B2 | 3/2011 | Petersen et al. |
| 8,052,665 B2 | 11/2011 | Wastlund-Karlsson et al. |
| 8,096,667 B2 | 1/2012 | Boyd et al. |
| 8,147,476 B2 | 4/2012 | Veith et al. |
| 8,168,853 B2 | 5/2012 | Autran et al. |
| 8,198,200 B2 | 6/2012 | Autran et al. |
| 8,445,744 B2 | 5/2013 | Autran et al. |
| 8,545,654 B2 | 10/2013 | Lakso et al. |
| 2002/0022426 A1 | 2/2002 | Curro et al. |
| 2002/0039867 A1 | 4/2002 | Curro et al. |
| 2004/0078018 A1 | 4/2004 | Gompel et al. |
| 2005/0276956 A1 | 12/2005 | Zink et al. |
| 2006/0169387 A1 | 8/2006 | Nayar et al. |
| 2007/0237924 A1 | 10/2007 | Bruce et al. |
| 2007/0298262 A1 | 12/2007 | Quiram et al. |
| 2008/0000003 A1 | 1/2008 | Melander |
| 2008/0045917 A1 | 2/2008 | Autran et al. |
| 2008/0207071 A1 * | 8/2008 | Muslet et al. .................... 442/1 |
| 2009/0047855 A1 | 2/2009 | Seth et al. |
| 2009/0299314 A1 | 12/2009 | Middlesworth et al. |
| 2010/0062221 A1 | 3/2010 | Hoenigmann et al. |
| 2010/0215923 A1 | 8/2010 | Frost |
| 2010/0285286 A1 | 11/2010 | Middlesworth |
| 2011/0027552 A1 | 2/2011 | Rodewald et al. |
| 2011/0151739 A1 | 6/2011 | Bosler et al. |
| 2011/0209270 A1 | 9/2011 | Carlson et al. |
| 2012/0022490 A1 | 1/2012 | Marche et al. |
| 2012/0164383 A1* | 6/2012 | Sollmann ..................... 428/141 |

FOREIGN PATENT DOCUMENTS

| | | |
|---|---|---|
| KR | 2011-0007609 | 1/2011 |
| WO | WO 91/15355 A1 | 10/1991 |
| WO | WO 96/18367 A2 | 6/1996 |
| WO | WO 99/48455 A1 | 9/1999 |
| WO | WO 01/45613 A1 | 6/2001 |
| WO | WO 01/45615 A1 | 6/2001 |
| WO | WO 2008/026106 A2 | 3/2008 |

* cited by examiner

METHOD OF MAKING EXTENSIBLE WEB LAMINATES

FIELD OF INVENTION

The present invention relates to a method of making extensible web laminates comprising a multilayer film and at least one web layer. The present invention also relates to the use of such extensible web laminates in personal care articles, such as diapers, training pants, adult incontinence devices, booties and garments.

BACKGROUND

Elastic films are commonly incorporated into personal care articles to better shape the articles to the contours of the body. Elastic films can be used, for example, in the waist and leg areas of diapers, the side panels of training pants, and the cuffs of disposable gowns. It is common to apply one or more web layers, such as a nonwoven layer, to the elastic films to make them more textile-like. Typically, a nonwoven layer is joined to the elastic film in a stretched state. When the elastic film is allowed to recover, the nonwoven layer gathers, or shirrs, to create an extensible nonwoven laminate in the direction of stretch.

The processing of elastic films during the manufacture of extensible web laminates poses a number of challenges. For example, elastic films that are intrinsically stretchable in the machine direction (MD) are difficult to maintain under constant tension in a manufacturing line and are prone to premature stretching.

Additionally, elastic films tend to neck when stretched. When an elastic film is stretched in the MD, increased necking can lead to increased film width variability down web, resulting in process challenges for film alignment and uniform product construction. As a result, diaper manufacturers will purchase wider films to insure the width of the film does not drop below the desired dimensions during processing. The excess film or film-nonwoven laminate is then trimmed to produce a uniform product, a step that leads to trim waste and potentially increased web breaks and down time.

Necking also reduces the elasticity of the film, resulting in less efficient use of a relatively expensive component of personal care articles. If a nonwoven layer is bonded to the elastic film in the stretched state, the width of the elastic film will be confined by the nonwoven to the necked width. In other words, the elastic film is unable to relax to its original width, resulting in an overall loss of elasticity.

Efforts have been made to reduce the amount of necking in elastic films during processing. For example, necking can be minimized by shortening the gap distance between sequential differential speed rolls during MD stretch. However, such a modification imparts greater stress on the elastic film, resulting in more web breaks, rejected products and/or process down time.

Another attempt to minimize necking involves a multilayer film comprising at least one elastomeric layer and at least one relatively nonelastomeric skin layer. The multilayer film is activated via MD stretching, preferably through a spatially modified activation method such as disclosed in U.S. Pat. No. 5,344,691, "Spatially Modified Elastic Laminates," (Hanschen, et al.). Once activated, the film exhibits less necking when subsequently stretched in the MD. However, as already mentioned above, films that are intrinsically stretchable in the MD have their own processing challenges (i.e. difficulty maintaining the film under constant tension in a manufacturing line and premature stretching).

Therefore, a need exists for a method of making extensible web laminates that makes efficient use of the elasticity of the film, minimizes film waste, and improves process handling capabilities of the film.

SUMMARY

In one embodiment, the invention provides a method of making an extensible web laminate comprising the steps of providing a multilayer film comprising two skin layers and an elastomeric core layer sandwiched therebetween, activating the multilayer film in a first direction, subsequently stretching the multilayer film past the deformation limit of the skin layers in a second direction perpendicular to the first direction, laminating a web layer to the multilayer film that is stretched in the second direction, and recovering the multilayer film to produce an extensible web laminate.

In another embodiment, the invention provides method of making an extensible web laminate comprising the steps of providing a multilayer film comprising two skin layers and an elastomeric core layer sandwiched therebetween where the multilayer film has been activated in the cross-machine direction, stretching the multilayer film past the deformation limit of the skin layers in the machine direction, laminating a web layer to the multilayer film while it is stretched in the machine direction, and recovering the multilayer film to produce an extensible web laminate.

Other features and aspects of the invention will become apparent by consideration of the detailed description and accompanying drawings.

DETAILED DESCRIPTION

Definitions

As used herein, the term "activate," and variations thereof, refers to a material which has been mechanically deformed so as to impart elastic extensibility to a least a portion of the material. In the context of a multilayer film comprising two skin layers and an elastomeric core layer sandwiched therebetween, activate refers to the process of stretching at least a portion of the multilayer film beyond the elastic deformation limit of the skin layers and recovering the multilayer film to impart elastic extensibility to the film in the direction of stretch.

As used herein, the term "machine direction" or "MD" generally refers to the direction in which a material is produced. The term "cross-machine direction" or "CD" refers to the direction perpendicular to the machine direction.

As used herein, the terms "recover," and variations thereof, refer to a contraction of a stretched material upon termination of a biasing force following stretching of the material by application of the biasing force.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

Overview

The present invention relates to a method of making extensible web laminates comprising a multilayer film and at least one web layer. The multilayer film comprises two skin layers and an elastomeric core layer sandwiched therebetween. The web layer typically comprises a nonwoven material, woven material, fine fiber netting and/or film with a textured surface (e.g., embossing pattern).

The multilayer film is generally activated in a first direction by stretching at least a portion of the multilayer film past the elastic deformation limit of the skin layers and recovering the skin layers with the elastomeric core layer to produce a multilayer film that is elastic in the first direction. The activated multilayer film is subsequently stretched beyond the deformation limit of the skin layers in a second direction substantially perpendicular (i.e., 90°±5°) to the first direction. At least one web layer is applied to the multilayer film while it is in the stretched state. The multilayer film is then recovered to produce an extensible web laminate.

During large scale production, the multilayer film is typically provided in roll form. In such instances, the first direction typically corresponds to the cross-machine direction (CD) on a manufacturing line, and the second direction typically corresponds to the machine-direction (MD). Therefore, for simplicity, the terms CD and MD are used throughout.

An advantage of the present invention lies in activating the multilayer film in the CD prior to MD stretch. CD activation reduces the necking of the multilayer film during MD stretch when contrasted with an unactivated multilayer film. Reduced necking means greater recovery of the multilayer film after MD stretch and hence more efficient use of the elastic material. Reduced necking also reduces width variability of the multilayer film during processing, thus reducing film and laminate waste and improving process handling capabilities. In addition, the CD activated multilayer film is relatively inelastic in the MD, and would therefore be less subject to premature stretching on a manufacturing line. Various aspects of the present invention are discussed further below.

Multilayer Films

The multilayer films of the present invention comprise two skin layers and an elastomeric core layer sandwiched therebetween. The multilayer film is relatively inelastic prior to activation. However, the film can be rendered elastic by stretching the multilayer film past the elastic deformation limit of the skin layers and recovering the skin layers with the elastomeric core layer to produce a multilayer film that is elastic in the direction of stretch. Due to the deformation of the skin layers during activation, the multilayer film exhibits a microtextured surface upon recovery. Microtexture refers to the structure of the skin layers in the area of activation. More particularly, the skin layers contain peak and valley irregularities or folds, the details of which cannot be seen without magnification.

Figure 1:
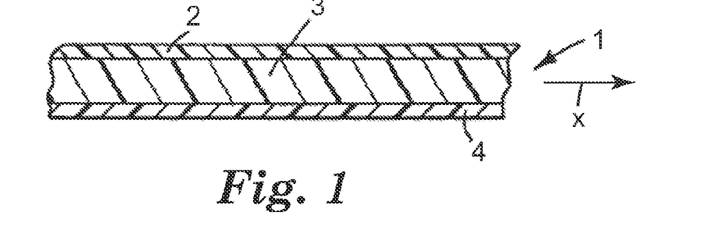
FIG. 1 is a schematic cross-sectional segment of an exemplary unactivated multilayer film.
Figure 2:
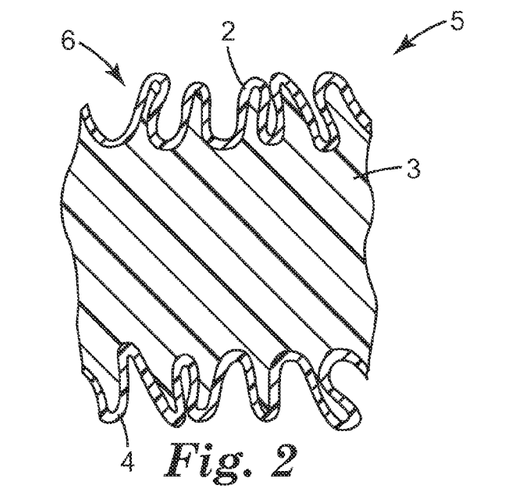
FIG. 2 is a schematic cross-sectional segment of the film in FIG. 1 after it has been activated in the x direction.

An exemplary unactivated multilayer film is illustrated in FIG. 1. The unactivated multilayer film 1 has two skin layers 2, 4 and an elastomeric core layer 3 sandwiched therebetween. The multilayer film 1 can be activated, for example, by stretching the multilayer film 1 in direction x past the elastic deformation limit of the skin layers 2, 4 and allowing the multilayer film 1 to recover. As illustrated in FIG. 2, the activated multilayer film 5 exhibits a microtextured surface structure 6.

Figure 5:
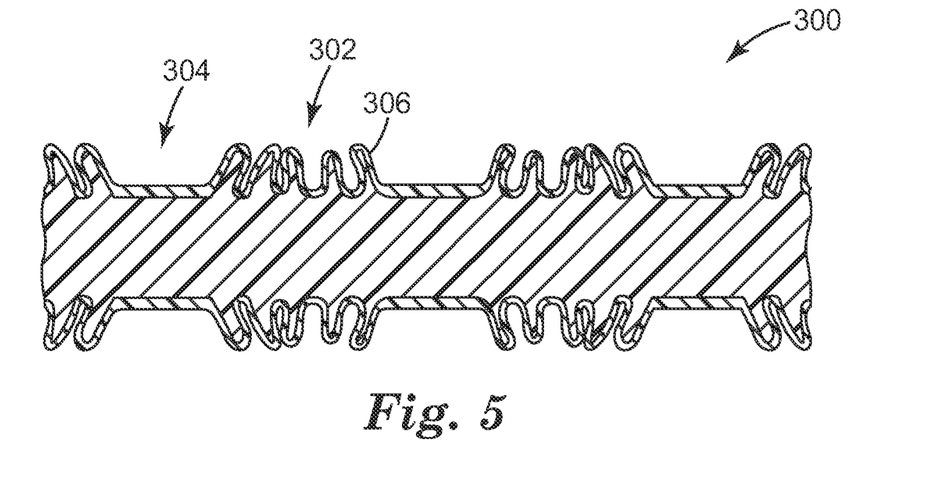
FIG. 5 is a schematic cross-sectional segment of a multilayer film that has been activated by the apparatus of FIG. 4.

Although FIG. 2 illustrates microtextured surface structure across the entire film, it should be understood that regions of the multilayer film can be activated while still imparting elasticity to the film as a whole. FIG. 5 illustrates the microtexture surface structure of a multilayer film that is activated in select regions. For example, the film of FIG. 1 can be incrementally stretched by a ring rolling apparatus, as discussed in further detail below. Alternatively, the multilayer film can be designed to preferentially stretch in certain regions by controlling the relative elastic modulus values of selected cross-sectional areas of the multilayer film to be less than the modulus values of adjacent cross-section areas of the multilayer film, thus leading to an elastic multilayer film having activated and unactivated regions.

The elastomeric core layer can broadly include any material which is capable of being formed into a thin film layer and exhibits elastomeric properties at ambient conditions. Elastomeric means that the material will substantially resume its original shape after being stretched. Preferably, the elastomeric core layer will sustain only small permanent set following deformation of the skin layers and recovery, which set is preferably less than 20 percent and more preferably less than 10 percent of the original length after moderate elongation, e.g., about 400-500%. Generally, any elastomeric core layer is acceptable which is capable of being stretched to a degree that causes relatively consistent permanent deformation in the skin layers. This can be as low as 50% elongation. Preferably, however, the elastomeric core layer is capable of undergoing up to 300 to 1200% elongation at room temperature, and most preferably up to 600 to 800% elongation at room temperature. The elastomeric core layer can be both pure elastomers and blends with an elastomeric phase or content that will still exhibit substantial elastomeric properties at room temperature.

Both heat-shrink and non-heat-shrinkable elastomers are contemplated for use in the present invention. However, non-heat-shrinkable elastomers are preferred from a processing standpoint. Non-heat-shrinkable means that the elastomer, when stretched, will substantially recover without application of heat, sustaining only a small permanent set as discussed above. Non-heat-shrinkable polymers include block copolymers such as those known to those skilled in the art as A-B or A-B-A block copolymers. These block copolymers are described, for example, in U.S. Pat. No. 3,265,765, "Block Polymers of Monovinyl Aromatic Hydrocarbons and Conjugated Dienes," (Holden, et al.); U.S. Pat. No. 3,562,356, "Block Copolymer Blends with Certain Ethylene-Unsaturated Ester Copolymers," (Nyberg, et al.); U.S. Pat. No. 3,700,633, "Selectively Hyrdogenated Block Copolymers," (Wald, et al.); U.S. Pat. No. 4,116,917, "Hydrogenated Star-Shaped Polymer," (Eckert); and U.S. Pat. No. 4,156,673, "Hydrogenated Star-Shaped Polymer," (Eckert). Styrene/isoprene, butadiene or ethylene-butylene/styrene (SIS, SBS or SEBS) block copolymers are particularly useful. Other useful elastomeric compositions can include elastomeric polyurethanes, ethylene copolymers such as ethylene vinyl acetates, ethylene/propylene copolymer elastomers or ethylene/propylene/diene terpolymer elastomers. Blends of these elastomers with each other or with modifying non-elastomers are also contemplated. In some embodiments, the elastomeric core layer is a blend of styrene-isoprene-styrene (SIS) and polystyrene. In more particular embodiments, the SIS:polystyrene weight ratio ranges from 2:1 to 19:1.

Viscosity reducing polymers and plasticizers can also be blended with the elastomers such as low molecular weight polyethylene and polypropylene polymers and copolymers, or tackifying resins. Tackifiers can also be used to increase the adhesiveness of an elastomeric core layer to a skin layer. Examples of tackifiers include aliphatic or aromatic hydrocarbon liquid tackifiers, polyterpene resin tackifiers, and hydrogenated tackifying resins. Aliphatic hydrocarbon resins are preferred.

Additives such as dyes, pigments, antioxidants, antistatic agents, bonding aids, fillers, antiblocking agents, slip agents, heat stabilizers, photostabilizers, foaming agents, glass bubbles, reinforcing fiber, starch and metal salts for degradability or microfibers can also be used in the elastomeric core layer.

The skin layers can be formed of any semi-crystalline or amorphous polymer that is less elastic than the elastomeric core layer and will undergo permanent deformation at the desired percent stretch of the multilayer film. Therefore, slightly elastomeric compounds, such as some olefinic elastomers, e.g. ethylene-propylene elastomers or ethylene-propylene-diene terpolymer elastomers or ethylenic copolymers, e.g., ethylene vinyl acetate, can be used as skin layers, either alone or in blends. However, the skin layer is generally a polyolefin such as polyethylene, polypropylene, polybutylene or a polyethylene-polypropylene copolymer, but may also be wholly or partly polyamide such as nylon, polyester such as polyethylene terephthalate, polyvinylidene, polyacrylate such as poly(methyl methacrylate) (only in blends) and the like, and blends thereof. Generally, following activation of the multilayer film, the skin layers are in contact with the elastomeric core layer in at least one of three suitable modes: first, continuous contact between the core layer and the microtextured skin layers, as illustrated in FIG. 2; second, continuous contact between the core layer and the microtextured skin layers with cohesive failure of the core layer; and third, adhesive failure of the skin layers to the core layer under the microtextured folds with intermittent skin layer to core layer contact. Generally, in the context of the present invention, all three forms of skin-to-core contact are acceptable. However, preferably the skin and core layers are in substantially continuous contact so as to minimize the possibility of delamination of the skin layers from the core layer.

Additives useful in the skin layers include, but are not limited to, mineral oil extenders, antistatic agents, pigments, dyes, antiblocking agents, provided in amounts less than about 15%, starch and metal salts for degradability and stabilizers such as those described for the elastomeric core layer.

Other layers may be added between the elastomeric core layer and the skin layers, such as tie layers, to improve the bonding of the skin and core layers. Tie layers can be formed of, or compounded with, typical compounds for this use including maleic anhydride modified elastomers, ethyl vinyl acetates and olefins, polyacrylic imides, butyl acrylates, peroxides such as peroxypolymers, e.g., peroxyolefins, silanes, e.g., epoxysilanes, reactive polystyrenes, chlorinated polyethylene, acrylic acid modified polyolefins and ethyl vinyl acetates with acetate and anhydride functional groups and the like, which can also be used in blends or as compatibilizers or delamination-promoting additives in one or more of the skin or core layers.

The multilayer films can be prepared by coextrusion of the elastomeric core layer and skin layers. Alternatively, the multilayer films can be prepared by application of the elastomeric core layer onto the skin layers or vice versa. Such techniques are well-known to those skilled in the art.

The core:skin thickness ratio of the multilayer films are preferably controlled to allow for an essentially homogeneous activation of the multilayer film. The core:skin thickness ratio is defined as the ratio of the thickness of the elastomeric core layer over the sum of the thicknesses of the two skin layers. Additionally, the core:skin thickness ratio of the multilayer film needs to be selected so that when the skin layers are stretched beyond their elastic deformation limit and relaxed with the elastomeric core layer, the skin layers form a microtextured surface. The desired core:skin ratio will depend upon several factors, including the composition of the film. In some embodiments of the present invention, the core:skin ratio of the multilayer film is at least 2:1. In other embodiments, the core:skin ratio of the multilayer film is at least 3:1.

It is also desirable that the multilayer films exhibit a force to stretch 10% in MD, as defined in the Examples section, of at least 2.5 N/25.4 mm, more preferably at least 5 N/25.4 mm. The force to stretch 10% in MD correlates with the amount of force required to stretch the skin layers of the multilayer film beyond their elastic deformation limit. The force to stretch 10% in MD should be high enough to reduce premature stretching of the multilayer film on a process line. In some embodiments of the present invention, the force to stretch 10% in MD ranges from 5 N/25.4 mm to 10 N/25.4 mm.

Exemplary multilayer films for the present invention are disclosed in U.S. Pat. No. 5,462,708, "Elastic Film Laminate," (Swenson, et al.), U.S. Pat. No. 5,344,691, "Spatially Modified Elastic Laminates," (Hanschen, et al.), and U.S. Pat. No. 5,501,679, "Elastomeric Laminates with Microtextured Skin Layers," (Krueger, et al.), which are incorporated herein by reference. Suitable commercially available films include M-235 available from 3M Company in St. Paul, Minn., USA.

The skin layers of the multilayer films may be the same composition or different. Similarly, the skin layers may be the same thickness or different. In one preferred embodiment, the skin layers are the same composition and thickness.

In some embodiments of the present invention, the core layer of the multilayer film is a styrenic block copolymer and the skin layers of the multilayer film are each a polyolefin. In other embodiments, the core layer of the multilayer film is a SIS and polystyrene blend and the skin layers of the multilayer film are each a polypropylene and polyethylene blend. In yet other embodiments, the core layer of the multilayer film is a SIS and polystyrene blend and the skin layers of the multilayer film are each polypropylene.

Webs

The web layer broadly comprises a material that is non-tacky and, preferably, soft to the touch. Examples of web materials include nonwoven materials, woven materials, fine fiber netting and films with a textured surface (e.g., embossing pattern). The web materials may be inelastic or elastic.

Nonwoven webs are particularly suited for extensible web laminates in the personal care industry. The term "nonwoven web" generally refers to a web having a structure of individual fibers or threads which are interlaid, but not in an identifiable manner as in a knitted fabric. Suitable processes for making nonwoven webs include, but are not limited to, airlaying, spunbond, spunlace, bonded melt blown webs and bonded carded web formation processes. Spunbond nonwoven webs are made by extruding a molten thermoplastic as filaments from a series of fine die orifices in a spinneret. The diameter of the extruded filaments is rapidly reduced under tension by, for example, non-eductive or eductive fluid-drawing or other known spunbond mechanisms, such as described in U.S. Pat. No. 4,340,563, "Method for Forming Nonwoven Webs," (Appel, et al.); U.S. Pat. No. 3,692,618, "Continuous Filament Nonwoven Web," (Dorschner et al.); U.S. Pat. No. 3,338,992, "Process for Forming Non-Woven Filamentary Structures from Fiber-Forming Synthetic Organic Polymers," (Kinney); U.S. Pat. No. 3,341,394, "Sheets of Randomly Distributed Continuous Filaments," (Kinney); U.S. Pat. No. 3,502,763, "Process of Producing Non-Woven Fabric Fleece," (Hartmann); and U.S. Pat. No. 3,542,615, "Process for Producing a Nylon Non-Woven Fabric," (Dobo et al.).

The nonwoven web layer also may be made from bonded carded webs. Carded webs are made from separated staple fibers, which fibers are sent through a combing or carding unit which separates and aligns the staple fibers in the machine direction so as to form a generally machine direction-oriented fibrous nonwoven web. However, randomizers can be used to reduce this machine direction orientation. Once the carded web has been formed, it is then bonded by one or more of several bonding methods to give it suitable tensile properties. One bonding method is powder bonding wherein a powdered adhesive is distributed through the web and then activated, usually by heating the web and adhesive with hot air. Another bonding method is pattern bonding wherein heated calender rolls or ultrasonic welding equipment are used to bond the fibers together, usually in a localized bond pattern though the web can be bonded across its entire surface if so desired. Generally, the more the fibers of a web are bonded together, the greater the nonwoven web tensile properties.

Airlaying is another process by which fibrous nonwoven webs useful in the present invention can be made. In the airlaying process, bundles of small fibers usually having lengths ranging between about 6 to about 19 millimeters are separated and entrained in an air supply and then deposited onto a forming screen, often with the assistance of a vacuum supply. The randomly deposited fibers are then bonded to one another using, for example, hot air or a spray adhesive.

Alternatively, known melt blown webs or spunlace nonwoven webs or the like can be used to form the nonwoven webs. Melt blown webs are formed by extrusion of thermoplastic polymers from multiple die orifices, which polymer melt streams are immediately attenuated by hot high velocity air or steam along two faces of the die immediately at the location where the polymer exits from the die orifices. The resulting fibers are entangled into a coherent web in the resulting turbulent airstream prior to collection on a collecting surface. Generally, to provide sufficient integrity and strength for the present invention, melt blown webs must be further bonded such as by through air bonding, heat or ultrasonic welding as described above.

Fibers suitable for forming a nonwoven web can include, but are not limited to, natural fibers (e.g., woodpulp or cotton), manmade fibers produced from a wide variety of thermoplastic polymers, and combinations thereof. Suitable thermoplastic fiber forming polymers are selected from polyolefins, polyamides, polyesters, copolymers containing acrylic monomers, and blends and copolymers thereof. Suitable polyolefins include polyethylene, e.g., linear low density polyethylene, high density polyethylene, low density polyethylene and medium density polyethylene; polypropylene, e.g., isotactic polypropylene, syndiotactic polypropylene, blends thereof and blends of isotactic polypropylene and atactic polypropylene; polybutylene, e.g., poly(1-butene) and poly(2-butene); and polypentene, e.g., poly-4-methylpentene-1 and poly(2-pentene); as well as blends and copolymers thereof. Suitable polyamides include nylon 6, nylon 6/6, nylon 10, nylon 4/6, nylon 10/10, nylon 12, nylon 6/12, nylon 12/12, and hydrophilic polyamide copolymers such as copolymers of caprolactam and an alkylene oxide, e.g., ethylene oxide, and copolymers of hexamethylene adipamide and an alkylene oxide, as well as blends and copolymers thereof. Suitable polyesters include polyethylene terephthalate, polybutylene terephthalate, polycyclohexylenedimethylene terephthalate, and blends and copolymers thereof. Acrylic copolymers include ethylene acrylic acid, ethylene methacrylic acid, ethylene methylacrylate, ethylene ethylacrylate, ethylene butylacrylate and blends thereof.

There are no particular limitations on the selection of web. In some embodiments of the present invention, the web is a spunbond nonwoven having a basis weight in the range of 10-13 gsm.

The extensible web laminate can comprise one or more webs. The webs can be coextensive with the multilayer film or have different dimensions than the multilayer film. If the extensible web laminate comprises multiple webs, the webs can have the same or different composition(s), the same or different basis weight(s), and the same or different dimension(s).

Method

Figure 3:
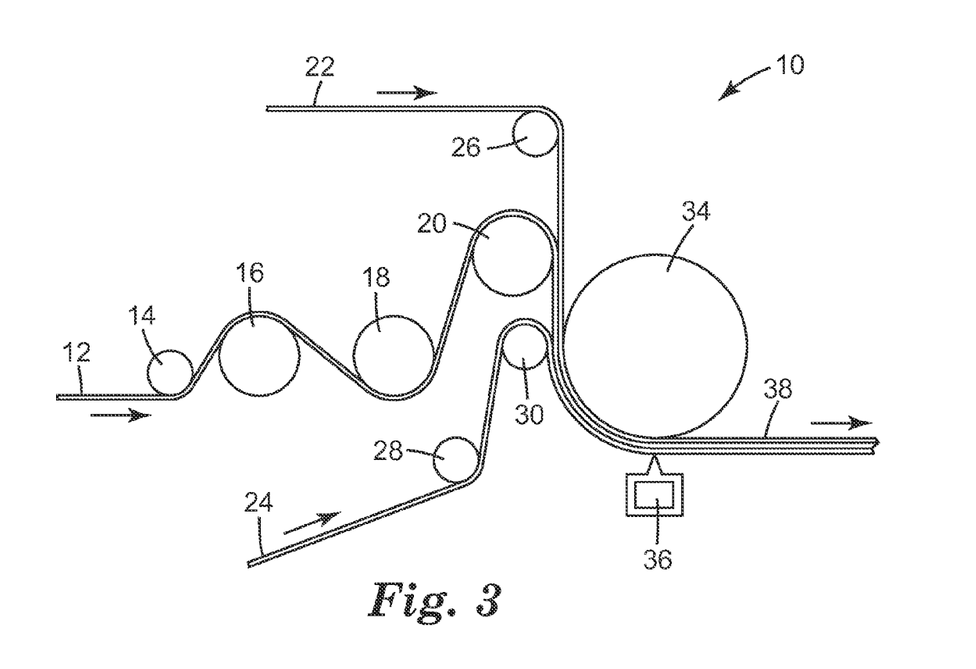
FIG. 3 is a schematic view of an exemplary apparatus used to make an extensible web laminate.

An exemplary apparatus 10 for making an extensible web laminate is illustrated in FIG. 3. A multilayer film 12 is first activated in the CD (not shown) by stretching at least a portion of the multilayer film beyond the elastic deformation limit of the skin layers and recovering the multilayer film to impart elastic extensibility to the film in the direction of stretch. CD stretch can be affected by a number of devices well known to those skilled in the art including, but not limited to, tenter frames, diverging disks, and incremental stretching devices.

Stretching by tenter frames is described, for instance, in U.S. Pat. No. 7,320,948, "Extensible Laminate Having Improved Stretch Properties and Method for Making Same," (Morman, et al.). Stretching by diverging disks is described, for example, in U.S. Publication 2011/0151739, "Activatable Precursor of a Composite Laminate Web and Elastic Composite Laminate Web," (Bosler et al.).

Figure 4:
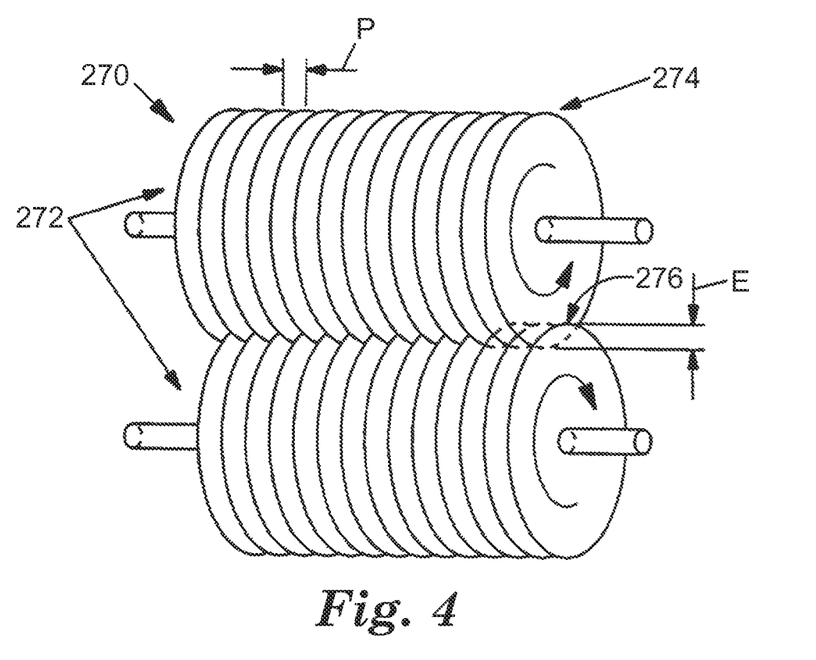
FIG. 4 is a schematic view of a ring-rolling apparatus.

A suitable incremental stretching device includes the ring-rolling apparatus described in U.S. Pat. No. 5,366,782, "Polymeric Web Having Deformed Sections Which Provide a Substantially Increased Elasticity to the Web," (Curro). As illustrated in FIG. 4, the ring-rolling apparatus 270 includes opposing rolls 272 having intermeshing teeth 274 that incrementally stretch the multilayer film as it passes through the rolls 272. The rolls 272 consist of teeth 274 which are separated by a uniform distance, p, more commonly known as pitch. The teeth 274 of each roll 272 are offset by a distance P/2 from ach other. The distance between the outer circumferences 276 of the rolls 272 can be varied by an intermeshing distance, E, more commonly known as the engagement.

As the multilayer film enters the ring-rolling apparatus 270, the film is constrained at the tips of the teeth 274 and incrementally stretched between the teeth 274 in an amount that is proportional to the pitch, p, and engagement, E. As the engagement E of the rolls 272 is increased, the amount of stretching in this region of the film is increased. In the present method, the amount of stretching between the teeth 274 is sufficient to stretch the skin layers of the multilayer film past their deformation limit. When the film exits the rolls 272, the deformed skin layers relax with the elastomeric layer to create alternating lanes of activated and unactivated film. The ring-rolled film is thus elastic in the CD within the activated lanes. The skin layers in the activated lanes of the multilayer film will exhibit a microtextured surface structure.

FIG. 5 illustrates a segment of multilayer film activated by ring-rolling. The multilayer film 300 has regions of activated film 302 and unactivated film 304. The regions of activated film 302 exhibit microtextured surface structure 306.

Irrespective of method, CD activation requires that the skin layers of the multilayer film be stretched past their elastic deformation limit. The degree of stretch imparted to the film can be represented by the stretch ratio. Stretch ratio in the context of CD activation is defined as the width of the stretched film to the width of the unstretched film. The typical stretch ratio is more than required to stretch the skin layers beyond the elastic deformation limit but less than that required to permanently deform the elastic core layer, except for the small permanent set mentioned above. In some embodiments, the stretch ratio of the multilayer film ranges from 2:1 to 5:1.

CD activation of the multilayer film can be performed in-line with the apparatus used to make the extensible web laminate. Alternatively, CD activation can be performed off-line and the CD activated multilayer film 12 supplied in roll form.

As illustrated in FIG. 3, the CD activated multilayer film 12, whether activated in-line or off-line, is transferred by one or more guide rolls 14 to a series of differential speed rolls 16, 18, 20. There is no biasing force on the multilayer film 12 in the CD as it is fed into the apparatus 10. As the multilayer film 12 passes through the differential speed rolls 16, 18, 20, the film is stretched in the MD past the deformation limit of the skin layers.

In one embodiment, the differential speed rolls 16, 18, 20 operate at increasingly greater speeds the further downline they are located, with roll 20 operating at the greatest speed and roll 16 operating at the lowest speed. The speed may increase linearly or non-linearly from one roll to the next. In an alternative embodiment, the speed rolls 16, 18, 20 may pulsate. For example, roll 18 may operate at a slower speed than either of rolls 16 and 20, causing the film to go through sequences of stretch and recovery. The distance between adjacent speed rolls 16, 18, 20 can be the same or different. The horizontal gap between rolls 16, 18, 20 must be greater than the thickness of the film. Although three differential speed rolls 16, 18, 20 are illustrated in FIG. 3, it should be understood that two or more differential speed rolls may be used.

Web layer 22 is fed into the apparatus 10 by guide roll 26 to one side of the multilayer film 12. Web layer 24 is fed into the apparatus by guide rolls 28, 30 to the opposite side of the multilayer film 12. In some embodiments, the web layers 22, 24 are applied to only a portion of the multilayer film 12. In other embodiments, the web layers 22, 24 are coextensive with the multilayer film 12. In yet other embodiments, the web layers 22, 24 are wider in the CD than the multilayer film 12. The web layers 22, 24 can be the same composition or different. The width of the web layers 22, 24 in the CD can be the same or different.

Layers 22, 12, 24 are then laminated together using ultrasonic welding (or bonding). Ultrasonic welding generally refers to a process performed, for example, by passing layers 22, 12, 24 between a sonic horn 36 and a patterned roll (e.g., anvil roll) 34. Such bonding methods are well-known in the art. For instance, ultrasonic welding through the use of a stationary horn and a rotating patterned anvil roll is described in U.S. Pat. No. 3,844,869, "Apparatus for Ultrasonic Welding of Sheet Materials," (Rust Jr.); and U.S. Pat. No. 4,259,399, "Ultrasonic Nonwoven Bonding," (Hill). Moreover, ultrasonic welding through the use of a rotary horn with a rotating patterned anvil roll is described in U.S. Pat. No. 5,096,532, "Ultrasonic Rotary Horn," (Neuwirth, et al.); U.S. Pat. No. 5,110,403, "High Efficiency Ultrasonic Rotary Horn," (Ehlert); and U.S. Pat. No. 5,817,199, "Methods and Apparatus for a Full Width Ultrasonic Bonding Device," (Brennecke, et al.). Of course, any other ultrasonic welding technique may also be used in the present invention.

In some embodiments, the patterned roll 34 and differential speed roll 20 operate at the same speed. In alternative embodiments, the patterned roll 34 and differential speed roll 20 operate at different speeds, where the patterned roll 34 acts as an extension of the differential speed rolls 16, 18, 20.

The laminated layers 12, 22, 24 are withdrawn from the pattern anvil 34 and recovered to form an extensible web laminate 38. The extensible web laminate 38 can be stored in roll form (not shown) for incorporation into an article in a separate process. Alternatively, the web laminate can be stored in roll form in the stretched state and recovered at a later time.

It is also possible to combine the method of making an extensible web laminate with a downline process of manufacturing an article. For example, the web laminate may be maintained in a stretched state after it is withdrawn from the pattern anvil 34 and incorporated into an article in a downline process before allowing the web laminate to recover.

Although FIG. 3 uses ultrasonic welding to combine the layers of the web laminate, it should be understood that the web layers may be laminated to the multilayer film by a variety of processes including, but not limited to, adhesive bonding, thermal bonding, point bonding, ultrasonic welding and combinations thereof. Suitable adhesives include water-based, solvent-based, pressure-sensitive, and hot-melt adhesives. Each of these processes is well-known to those skilled in the art.

It should also be recognized that the extensible web laminate may comprise only one web layer or more than two web layers. For example, in FIG. 3, the web layer 22 or 24 could be omitted, thus generating an extensible web laminate with only one web layer.

In one embodiment of the present invention, web layers 22, 24 each comprise a nonwoven layer and are ultrasonically welded to the CD activated multilayer film 12. Ultrasonic welding is particularly advantageous for a web laminate of this construction as described in U.S. Pat. No. 6,884,494, "Laminate Web," (Curro et al.). Ultrasonic welding can be used to join the two nonwoven layers through the multilayer film, creating an extensible nonwoven laminate in which the multilayer film is apertured but the nonwoven layers are not. This configuration is particularly useful in applications requiring breathability. The two nonwoven layers can be the same or different. In some instances, it is advantageous if one nonwoven layer has a higher basis weight than the other.

In an alternative embodiment, the web layers 22, 24 each comprise a nonwoven layer and are ultrasonically welded to the CD activated multilayer film 12 such that apertures are created at the bond cites that extend through the multilayer film and both nonwoven layers. The two nonwoven layers can be the same or different. In some instances, it is advantageous if one nonwoven layer has a higher basis weight than the other.

In a further embodiment, a single nonwoven layer 22 or 24 is laminated to the CD activated multilayer film. This results in an extensible web laminate having a nonwoven layer on one side and the microtextured surface of the multilayer film on the opposite side. The microtextured surface is typically non-tacky and soft to the touch, and can be used as an external layer in various processes and applications.

In yet another embodiment, a single nonwoven layer is laminated to a CD activated film using any of the above-mentioned lamination processes where the multilayer film is colored and/or contains a print pattern. The multilayer film can be colored by the addition of pigments and/or dyes to one or more layers of the multilayer film. A print pattern can be added to the multilayer film using a variety of known printing processes. The printing can be added to the multilayer film, for example, before CD activation.

The above method provides several advantages. For example, by activating the multilayer film in the CD prior to MD stretch, the amount of necking during MD stretch is reduced when contrasted with MD stretch of an unactivated multilayer film. The reduction in % neck-in of an MD stretched multilayer film that has been CD activated is at least 1%, more particularly at least 5%, and even more particularly at least 10%. This includes embodiments where the reduction in % neck-in of an MD stretched multilayer film that has been CD activated is 1% to 17%. Reduced necking means greater recovery of the multilayer film after MD stretch and hence more efficient use of the elastic layer in the film. Reduced necking also reduces width variability of the multilayer film during processing, thus eliminating film waste and improving process handling capabilities.

In addition, the relatively inelastic multilayer film is less prone to premature stretching on a manufacturing line. The skin layers of the multilayer film render the unactivated film relatively inelastic. It is only when the multilayer film is stretched beyond the deformation limit of the skin layer(s) that the film can become elastic. Therefore, a multilayer film that has been activated in the CD is still relatively inelastic in the MD. As long as the tension on the multilayer film in a manufacturing line is below that required to exceed the deformation limit, the film is less likely to prematurely stretch. The multilayer films used in the present invention preferably exhibit a force to stretch 10% in MD of at least 2.5 N/25.4 mm, where the multilayer film has been activated in the CD prior to MD stretch.

Applications

The extensible web laminates made according to the above method can be used in a variety of applications. Suitable applications include, but are not limited to, elastic components in personal care articles such as diapers, training pants, adult incontinence devices, booties and garments.

Figure 6:
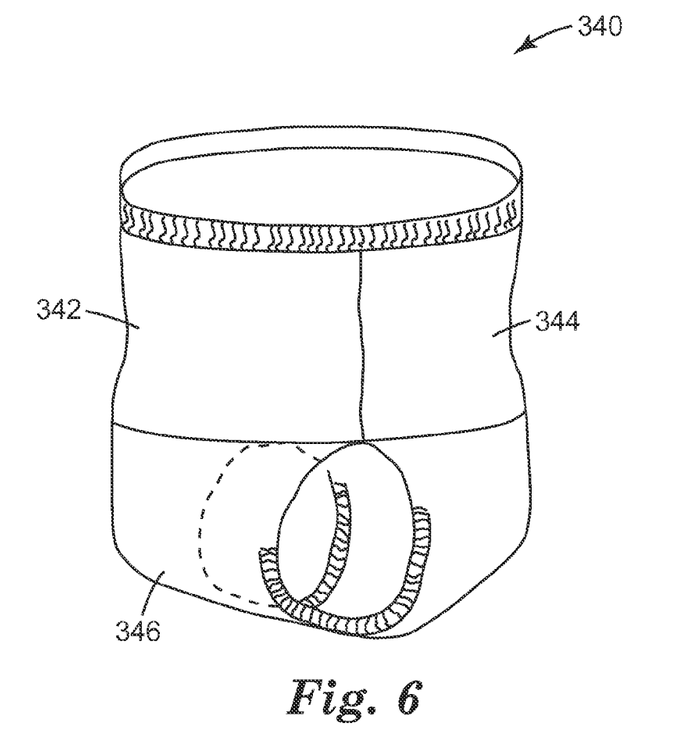
FIG. 6 is a schematic view of an adult incontinence device.

FIG. 6 illustrates an adult incontinence device 340 comprising extensible web laminates of the present invention. The adult incontinence device 340 comprises a front waist region 342, back waist region 344 and central region 346.

During use, the central region 346 fits between an individual's legs and is designed to absorb and retain bodily fluids. The central region typically comprises a liquid permeable topsheet, a liquid impermeable backsheet and an absorbent core enclosed therebetween. The liquid permeable topsheet can consist of a nonwoven layer, such as already described above with respect to the web layer of the extensible web laminate. Further examples of topsheet materials are porous foams, apertured plastic films, etc. The materials suitable as topsheet materials should be soft and non-irritating to the skin and be readily penetrated by urine.

The liquid impermeable backsheet may consist of a thin plastic film, e.g., a polyethylene or polypropylene film, a nonwoven material coated with a liquid impervious material, a hydrophobic nonwoven material which resists liquid penetration, or laminates of plastic films and nonwoven materials. The backsheet material may be breathable so as to allow vapour to escape from the absorbent core, while still preventing liquids from passing through the backsheet material.

The topsheet and the backsheet material typically extend beyond the absorbent core and are connected to each other, e.g., by gluing or welding by heat or ultrasonic, about the periphery of the absorbent core. The topsheet and/or the backsheet may further be attached to the absorbent core by any method known in the art, such as adhesive, heatbonding etc. The absorbent core may also be unattached to the topsheet and/or the backsheet.

The absorbent body can be of any conventional kind Examples of commonly occurring absorbent materials are cellulosic fluff pulp, tissue layers, highly absorbent polymers (so called superabsorbents), absorbent foam materials, absorbent nonwoven materials or the like. It is common to combine cellulosic fluff pulp with superabsorbents in an absorbent body. It is also common to have absorbent bodies comprising layers of different material with different properties with respect to liquid receiving capacity, liquid distribution capacity and storage capacity. The thin absorbent bodies often comprise a compressed mixed or layered structure of cellulosic fluff pulp and superabsorbent.

Figure 7A:
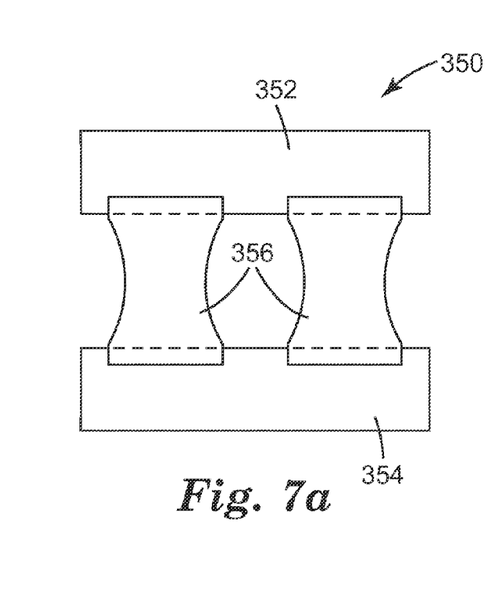
FIGS. 7a-c are schematic views of an exemplary method for making an adult incontinence device containing an extensible web laminate.
Figures 7B, 7C:
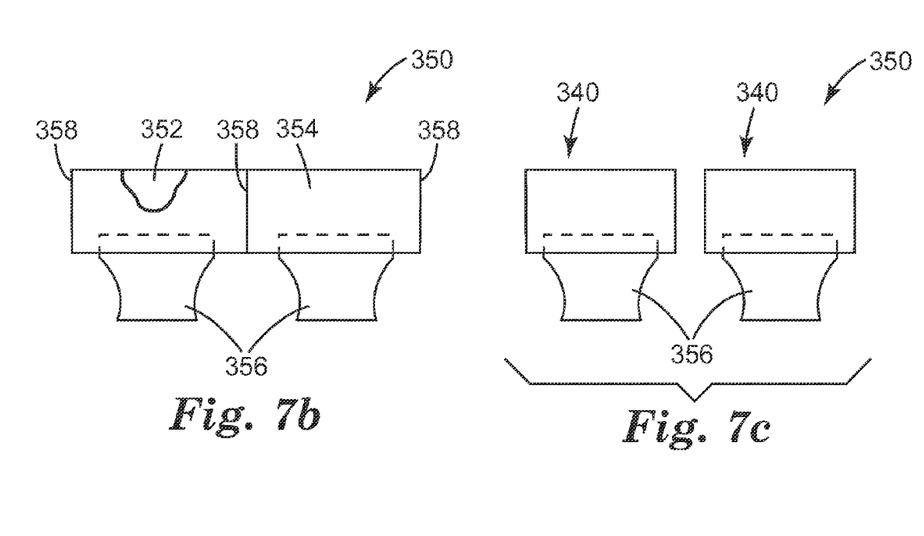

A process 350 for making the adult incontinence device 340 is illustrated in FIGS. 7a-c. The front and back waist regions 342, 344 in FIG. 6 are made from the elastic web laminates of the present invention and assist in conforming the adult incontinent device 340 to the contours of the body.

As illustrated in FIG. 7a, two extensible web laminates 352, 354 of the present invention are run parallel to each other on a manufacturing line 350. One extensible web corresponds to the front waist region 342 of the adult incontinence device and the second extensible web corresponds to the back waist region 344, as depicted in FIG. 6. The web laminates 352, 354 are typically maintained in a stretched state during processing. A gap exists between the two web laminates for placement of the central region 356 of the adult incontinence device.

The central region 356 typically comprises a liquid permeable topsheet, a liquid impermeable backsheet and an absorbent core enclosed therebetween, as discussed above. The central region can be assembled off-line or assembled further upstream in the process 350. Either way, the central region 356 is laid across the web laminates 352, 354 such that one end of the central region 356 overlaps web laminate 352, and the opposing end of the central region 356 overlaps web laminate 354. Central regions 356 are laid down at predetermined intervals, leaving a gap between adjacent central regions 356. The central regions 356 are attached to the web laminates 352, 354 using any number of known techniques including, but not limited to, adhesive bonding, heat bonding, ultrasonic welding, sewing or the like.

The combined web (i.e., web laminates 352, 354 and central regions 356) is then folded over onto itself as illustrated in FIG. 7b such that the two web laminates are coextensive with each other. The web laminates 352, 354 are then attached along bond lines 358 by, e.g., gluing or welding by heat or ultrasonic, and simultaneously, or subsequently severed. The web laminates 352, 354 recover to create adult incontinence devices 340, as illustrated in FIGS. 7c and 6.

FIGS. 7a-c illustrate just one method for making articles containing the extensible web laminates of the present invention. There are numerous variations on this method that are within the knowledge of one skilled in the art. Moreover, the extensible web laminate of the present invention can be used in a variety of applications where elastics are typically used to conform articles to the contour of the body. Methods for making such articles are also well-known.

Some Embodiments of the Disclosure

In a first embodiment, the present disclosure provides a method of making an extensible web laminate comprising:

providing a multilayer film comprising two skin layers and an elastomeric core layer sandwiched therebetween, where the multilayer film has been activated in the cross-machine direction;

stretching the multilayer film past the deformation limit of the skin layers in the machine direction;

laminating a web layer to the multilayer film while it is stretched in the machine direction; and recovering the multilayer film to produce an extensible web laminate.

In a second embodiment, the present disclosure provides the method of the first embodiment, wherein the multilayer film that has been activated in the cross-machine direction exhibits microtextured surface structure over a least a portion of the multilayer film.

In a third embodiment, the present disclosure provides the method of any one of the first to second embodiments, wherein the multilayer film has been activated in the cross-machine direction by incremental stretching.

In a fourth embodiment, the present disclosure provides the method of any one of the first to second embodiments, wherein the multilayer film has been activated in the cross-machine direction by diverging disks.

In a fifth embodiment, the present disclosure provides the method of any one of the first to fourth embodiments, wherein the stretch ratio of the multilayer film during activation in the cross-machine direction was 2:1 to 5:1.

In a sixth embodiment, the present disclosure provides the method of any one of the first to fifth embodiments, wherein the multilayer film is stretched in the machine direction by differential speed rolls.

In a seventh embodiment, the present disclosure provides the method of any one of the first to sixth embodiments, wherein the multilayer film is colored and/or contains a print pattern In an eighth embodiment, the present disclosure provides the method of any one of the first to seventh embodiments, wherein the web layer is a nonwoven layer.

In a ninth embodiment, the present disclosure provides the method of any one of the first to eighth embodiments, further providing a second web layer that is laminated to the multilayer film while it is stretched in the machine direction, where the multilayer film is sandwiched between the two web layers.

In a tenth embodiment, the present disclosure provides the method of any one of the first to ninth embodiments, wherein the web layers are laminated to the multilayer film by adhesive bonding, thermal bonding, point bonding, ultrasonic welding or combinations thereof In an eleventh embodiment, the present disclosure provides the method of any one of the first to ninth embodiments, wherein the web layers are laminated to the multilayer film by ultrasonic welding.

In a twelfth embodiment, the present disclosure provides the method of the eighth embodiment, further providing a second nonwoven layer that is laminated to the multilayer film while it is stretched in the machine direction, where the multilayer film is sandwiched between the two nonwoven layers.

In a thirteenth embodiment, the present disclosure provides the method of the twelfth embodiment, wherein each of the nonwoven layers have a different basis weight.

In a fourteenth embodiment, the present disclosure provides the method of any one of the twelfth to thirteenth embodiments, wherein the nonwoven layers are laminated to the multilayer film by ultrasonic welding.

In a fifteenth embodiment, the present disclosure provides the method of any one of twelfth to fourteenth embodiments, wherein the multilayer film is apertured but the nonwoven layers are not.

In a sixteenth embodiment, the present disclosure provides the method of any one of the twelfth to fourteenth embodiments, wherein the multilayer film and nonwoven layers are apertured.

In a seventeenth embodiment, the present disclosure provides the method of any one of the first to sixteenth embodiments, wherein the core:skin ratio of the multilayer film prior to activating the multilayer film in the cross-machine direction is at least 2:1.

In an eighteenth embodiment, the present disclosure provides the method of any one of the first to sixteenth embodiments, wherein the core:skin ratio of the multilayer film prior to activating the multilayer film in the cross-machine direction is at least 3:1.

In a nineteenth embodiment, the present disclosure provides the method of any one of the first to eighteenth embodiments, wherein the elastomeric core layer is a styrenic block copolymer and the skin layers are each a polyolefin.

In a twentieth embodiment, the present disclosure provides the method of any one of the first to eighteenth embodiments, wherein the elastomeric core layer is a SIS and polystyrene blend and the skin layers are a polypropylene and polyethylene blend.

In a twenty-first embodiment, the present disclosure provides the method of any one of the first to eighteenth embodiments, wherein the elastomeric core layer is a SIS and polystyrene blend and the skin layers are polypropylene.

In a twenty-second embodiment, the present disclosure provides the method of any one of the first to twenty-first embodiments, wherein the force to stretch a 25.4 mm wide sample of the multilayer film 10% in the machine direction is at least 2.5 N, where the multilayer film has been activated in the cross-machine direction prior to stretch.

In a twenty-third embodiment, the present disclosure provides the method of any one of the first to twenty-first embodiments, wherein the force to stretch a 25.4 mm wide sample of the multilayer film 10% in the machine direction is about 5N to 10 N, where the multilayer film has been activated in the cross-machine direction prior to stretch.

In a twenty-fourth embodiment, the present disclosure provides the method of any one of the first to twenty-third embodiments, wherein the reduction in % neck-in during the step of stretching the multilayer film past the deformation limit of the skin layers in the machine direction is at least 1% when contrasted with the multilayer film that has not been activated in the cross-machine direction.

In a twenty-fifth embodiment, the present disclosure provides the method of any one of the first to twenty-third embodiments, wherein the reduction in % neck-in during the step of stretching the multilayer film past the deformation limit of the skin layers in the machine direction is at least 5% when contrasted with the multilayer film that has not been activated in the cross-machine direction.

In a twenty-sixth embodiment, the present disclosure provides the method of any one of the first to twenty-fifth embodiments, wherein the extensible web laminate is incorporated into a personal care article.

In a twenty-seventh embodiment, the present disclosure provides the a method of making an extensible web laminate comprising:
  providing a multilayer film comprising two skin layers and an elastomeric core layer sandwiched therebetween,
  activating the multilayer film in a first direction;
  subsequently stretching the multilayer film past the deformation limit of the skin layers in a second direction perpendicular to the first direction;
  laminating a web layer to the multilayer film that is stretched in the second direction; and
  recovering the multilayer film to produce an extensible web laminate.

In a twenty-eighth embodiment, the present disclosure provides the method of the twenty-seventh embodiment, wherein activating the multilayer film in the first direction creates microtextured surface structure over a least a portion of the multilayer film.

In a twenty-ninth embodiment, the present disclosure provides the method of any one of the twenty-seventh to twenty-eighth embodiments, wherein activating the multilayer film in the first direction is done by incremental stretching.

In a thirtieth embodiment, the present disclosure provides the method of any one of the twenty-seventh to twenty-eighth embodiments, wherein activating the multilayer film in the first direction is done by diverging disks.

In a thirty-first embodiment, the present disclosure provides the method of any one of the twenty-seventh to thirtieth embodiments, wherein the stretch ratio of the multilayer film during activation in the first direction is 2:1 to 5:1.

In a thirty-second embodiment, the present disclosure provides the method of any one of the twenty-seventh to thirty-first embodiments, wherein the multilayer film is stretched in the second direction by differential speed rolls.

In a thirty-third embodiment, the present disclosure provides the method of any one of the twenty-seventh to thirty-second embodiments, wherein the multilayer film is colored and/or contains a print pattern In a thirty-fourth embodiment, the present disclosure provides the method of any one of the twenty-seventh to thirty-third embodiments, wherein the web layer is a nonwoven layer.

In a thirty-fifth embodiment, the present disclosure provides the method of any one of the twenty-seventh to thirty-fourth embodiments, further providing a second web layer that is laminated to the multilayer film while it is stretched in the second direction, where the multilayer film is sandwiched between the two web layers.

In a thirty-sixth embodiment, the present disclosure provides the method of any one of the twenty-seventy to thirty-fifth embodiments, wherein the web layers are laminated to the multilayer film by adhesive bonding, thermal bonding, point bonding, ultrasonic welding or combinations thereof.

In a thirty-seventh embodiment, the present disclosure provides the method of any one of the twenty-seventh to thirty-fifth embodiments, wherein the web layers are laminated to the multilayer film by ultrasonic welding.

In a thirty-eighth embodiment, the present disclosure provides the method of the thirty-fourth embodiment, further providing a second nonwoven layer that is laminated to the multilayer film while it is stretched in the second direction, where the multilayer film is sandwiched between the two nonwoven layers.

In a thirty-ninth embodiment, the present disclosure provides the method of the thirty-eighth embodiment, wherein each of the nonwoven layers has a different basis weight.

In a fortieth embodiment, the present disclosure provides the method of any one of the thirty-eighth to thirty-ninth embodiments, wherein the nonwoven layers are laminated to the multilayer film by ultrasonic welding.

In a forty-first embodiment, the present disclosure provides the method of any one of the thirty-eighth to fortieth embodiments, wherein the multilayer film is apertured but the nonwoven layers are not.

In a forty-second embodiment, the present disclosure provides the method of any one of the thirty-eighth to fortieth embodiments, wherein the multilayer film and nonwoven layers are apertured.

In a forty-third embodiment, the present disclosure provides the method of any one of the twenty-seventh to forty-second embodiments, wherein the core:skin ratio of the multilayer film prior to activating the multilayer film in the first direction is at least 2:1.

In a forty-fourth embodiment, the present disclosure provides the method of any one of the twenty-seventh to forty-second embodiments, wherein the core:skin ratio of the multilayer film prior to activating the multilayer film in the first direction is at least 3:1.

In a forty-fifth embodiment, the present disclosure provides the method of any one of the twenty-seventh to forty-fourth, wherein the elastomeric core layer is a styrenic block copolymer and the skin layers are each a polyolefin.

In a forty-sixth embodiment, the present disclosure provides the method of any one of the twenty-seventh to forty-fourth embodiments, wherein the elastomeric core layer is a SIS and polystyrene blend and the skin layers are a polypropylene and polyethylene blend.

In a forty-seventh embodiment, the present disclosure provides the method of any one of the twenty-seventh to forty-forth embodiments, wherein the elastomeric core layer is a SIS and polystyrene blend and the skin layers are polypropylene.

In a forty-eighth embodiment, the present disclosure provides the method of any one of the twenty-seventh to forty-seventh embodiments, wherein the force to stretch a 25.4 mm wide sample of the multilayer film 10% in the second direction is at least 2.5 N, where the multilayer film has been activated in the first direction prior to stretch.

In a forty-ninth embodiment, the present disclosure provides the method of any one of the twenty-seventh to forty-seventh embodiments, wherein the force to stretch a 25.4 mm wide sample of the multilayer film 10% in the second direction is about 5N to 10 N, where the multilayer film has been activated in the first direction prior to stretch.

In a fiftieth embodiment, the present disclosure provides the method of any one of the twenty-seventh to forty-ninth embodiments, wherein the reduction in % neck-in during the step of stretching the multilayer film past the deformation limit of the skin layers in the second direction is at least 1% when contrasted with the multilayer film that has not been activated in the first direction.

In a fifty-first embodiment, the present disclosure provides the method of any one of the twenty-seventh to forty-ninth embodiments, wherein the reduction in % neck-in during the step of stretching the multilayer film past the deformation limit of the skin layers in the second direction is at least 5% when contrasted with the multilayer film that has not been activated in the first direction.

In a fifty-second embodiment, the present disclosure provides the method of any one of the twenty-seventh to fifty-first embodiments, wherein the first direction is the cross-machine direction and the second direction is the machine direction.

In a fifty-third embodiment, the present disclosure provides the method of any one of the twenty-seventh to fifty-second embodiments, wherein the extensible web laminate is incorporated into a personal care article.

EXAMPLES

The following examples are presented to illustrate some of the advantages of the above method of making an extensible web laminate and are not intended in any way to otherwise limit the scope of the invention.

Neck Width, Neck-In and % Neck-In of Elastic Films

Figure 8:
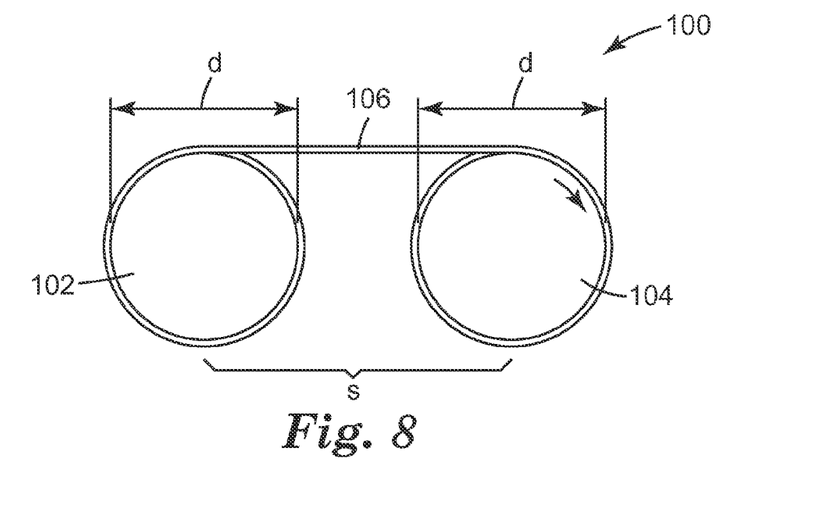
FIG. 8 is a schematic view of the apparatus used to measure the necking properties provided in Example 4.

Necking properties of the below multilayer films were determined while the films were stretched in the machine direction using the apparatus illustrated in FIG. 8. The necking device 100 included two aluminum rollers 102, 104. The rollers 102, 104 each had a diameter, d, of 110 mm, and were rotatably mounted on bearings fixed to a stand so that the center to center separation, s, of the rolls was 210 mm.

A strip of multilayer film 106 measuring approximately 300 mm long and 150 mm wide (Examples 1 and 2) and 60 mm wide (Example 3) was marked with spacer lines spanning in the cross direction and spaced 0.25 inch (6.35 mm) apart in the machine direction. One end of the film 106 was taped to the first roll 102 and the other end of the film 106 was taped similarly to the second roll 104. The second roll 104 was rotated to the point that there was no slack in, or tension exerted on, the film. With the first roll 102 held stationary, the film was stretched a predetermined amount in the machine direction by rotating the second roll 104. For example, a 3× stretch was achieved by turning the second roll 104 until the spacer lines were 0.75 inch (19.05 mm) apart in the machine direction. The "necked width" was determined by measuring the width of the stretched film at its narrowest point in the cross direction. The "neck-in" was determined by subtracting the "necked width" from the original unstretched film width. The "% neck-in" was calculated by dividing the "neck-in" by the original unstretched film width and multiplying by 100.

Force to Stretch 10% in MD

Figure 9A:
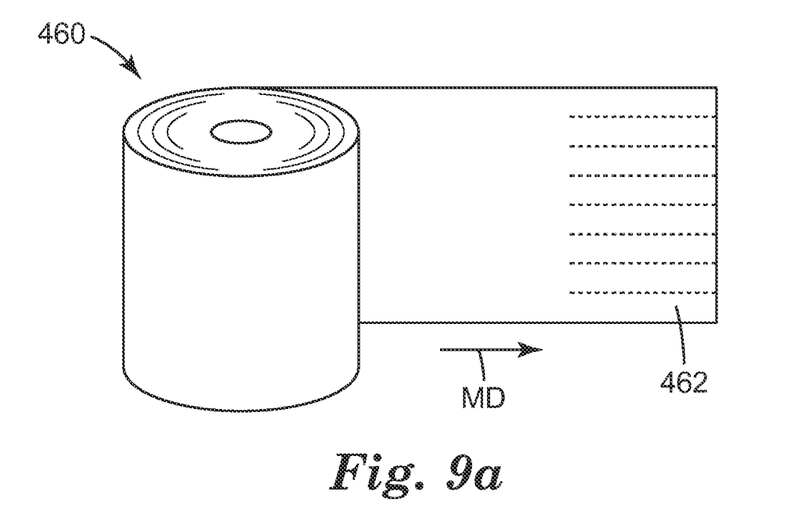
FIGS. 9a and 9b illustrate sample film preparation for determining the force to stretch film samples 10% in the machine direction, as outlined in the Examples section.
Figure 9B:
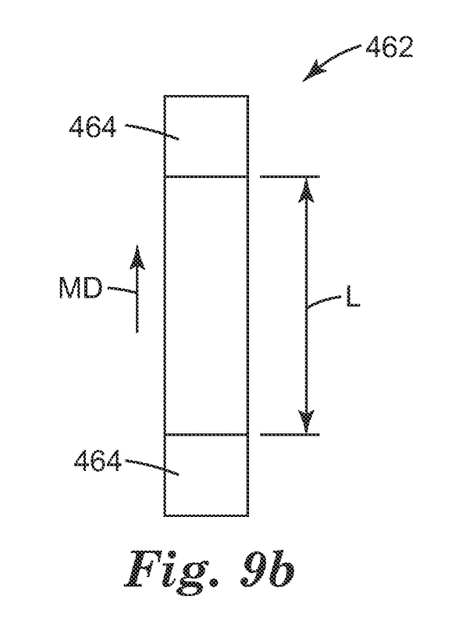

The force to stretch a sample of film 10% in the MD was determined as follows. A roll of film 460, as illustrated in FIG. 9a, was conditioned in a constant temperature (23°±2° C.) and constant humidity (50%±5%) room for 24 hours. A cutting template was then used to prepare film samples 462 that were 25.4 mm wide in the cross direction and at least 100 mm in length (machine direction). As illustrated in FIG. 9b, the ends of the film samples 462 were wrapped with masking or filament tape 464 such that the distance L between the inner edges of the taped ends was 50 mm. The ends of the film sample 462 were clamped into the jaws of an Instron 5500R constant rate of extension tensile tester with Bluehill material testing software. The masking or filament tape 464 reduced stretch and/or slippage of the ends of the film samples 462 during testing. The film samples 462 were stretched at 20 inches/minute, starting from a 50 mm gauge length and 25.4 mm width. The samples were pulled to break, and the force measured at 10% extension was recorded.

Control 1 (Unactivated M-235)

M-235 (available from 3M Company of St. Paul, Minn., USA) is an unactivated multilayer film having a basis weight of 40 g/m$^2$. The core is a blend of SIS and polystyrene. The skin layers are a blend of polypropylene and polyethylene. The core:skin thickness ratio is 4:1.

Example 1

CD Activated M-235

M-235 was incrementally stretched in the cross direction using an intermeshing stretcher similar to that described in U.S. Pat. No. 5,422,172, "Elastic Laminated Sheet of an Incrementally Stretched Nonwoven Fibrous Web and Elastomeric Film and Method," (Wu). The stretcher was configured to impart 224% strain across the multilayer film. The basis weight of activated M-235 was 35 g/m$^2$.

Control 2 (Unactivated Film)

A three-layer laminated film having an elastomeric core layer sandwiched between two outer skin layers was made with conventional co-extrusion techniques. The skin layers were 5 microns thick and made from PPH8069 resin (polypropylene available from Total Petrochemicals of Houston, Tex., USA). The core layer was 40 microns thick and made from of a blend of 70% by weight D1114 (SIS block copolymer available from Kraton of Houston, Tex., USA) and 30% by EMPERA 124N (polystyrene available from Nova Chemicals of Calgary, Alberta Calif.). The film has a basis weight of 55 gsm and a core:skin thickness ratio of 4:1

Example 2

CD Activated Film

Control 2 was stretched in the cross direction using a diverging disks device similar to that illustrated in FIG. 1 of U.S. Pat. No. 5,043,036, "Width Stretching Device," (Swenson). The film was stretched to 400% of its original width and then allowed to fully recover. The basis weight of activated Example 2 was 50 gsm.

Control 3 (Unactivated Film)

A three-layer laminated film having an elastomeric core layer sandwiched between two outer skin layers was made with conventional co-extrusion techniques. The skin layers were made from PPH8069 resin. The core layer was made from a blend of 95% by weight of Dl 114 and 5% EMPERA 124N. The basis weight was 45 gsm. The core/skin ratio was 4.1:1.

Example 3A

CD Activated Film

Control 3 was incrementally stretched in the cross direction using the process cited in Example 1. The stretcher was configured to impart 117% localized strain. The basis weight of activated Example 3A was 42 gsm.

Example 3B

CD Activated Film

Control 3 was incrementally stretched in the cross direction using the process cited in Example 1. The stretcher was configured to impart 297% localized strain. The basis weight of activated Example 3B was 42 gsm.

Example 4

The force to stretch a 25.4 mm sample of film 10% in the MD was determined according to the procedure provided above. The results are presented below.

The % neck-in was determined for each film using the procedure provided above. Measurements were taken for films stretched 2×, 3×, 4×, 5× and 6×. The average results for each film are also presented below.

|  | Force to stretch 25.4 mm wide sample 10% (N) | Initial Width (mm) | 2X | | 3X | | 4X | | 5X | | 6X | |
|---|---|---|---|---|---|---|---|---|---|---|---|---|
|  |  |  | Width (mm) | % Neck-In | Width (mm) | % Neck-In | Width (mm) | % Neck-In | Width (mm) | % Neck-In | Width (mm) | % Neck-In |
| Control 1 | 6 | 151.5 | 110 | 27% | 96 | 37% | 91 | 40% | 86 | 43% | 84 | 45% |
| Example 1 | 5.9 | 151.5 | 119 | 21% | 105 | 31% | 98 | 35% | 94 | 38% | 93 | 39% |
| Control 2 | 9.8 | 152 | 111 | 27% | 96 | 37% | 90 | 41% | 83 | 45% | 83 | 45% |
| Example 2 | 9.1 | 152 | 127 | 16% | 118 | 22% | 113 | 26% | 110 | 28% | BROKE | |
| Control 3 | 5.4 | 60 | 40 | 33% | 34 | 43% | 29 | 52% | 29 | 52% | BROKE | |
| Example 3A | 4.9 | 59 | 42 | 29% | 36 | 39% | 32 | 46% | 29 | 51% | 26 | 56% |
| Example 3B | 5.3 | 59 | 45 | 24% | 37 | 37% | 33 | 44% | 32 | 46% | 29 | 51% |

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

Thus, the invention provides, among other things, a method of making an extensible web laminate. Various features and advantages of the invention are set forth in the following claims.

What is claimed is:

1. A method of making an extensible web laminate comprising:
   providing a multilayer film comprising two skin layers and an elastomeric core layer sandwiched therebetween, where the multilayer film has been activated in the cross-machine direction by stretching at least a portion of the multilayer film beyond the elastic deformation limit of the skin layers and recovering the multilayer film to impart elastic extensibility to the film in the direction of stretch;
   after the multilayer film has been activated in the cross-machine direction, then stretching the multilayer film past the deformation limit of the skin layers in the machine direction;
   laminating a web layer to the multilayer film while it is stretched in the machine direction; and
   recovering the multilayer film to produce an extensible web laminate.

2. The method of claim 1, wherein the multilayer film that has been activated in the cross-machine direction exhibits microtextured surface structure over a least a portion of the multilayer film.

3. The method of claim 1, wherein the multilayer film has been activated in the cross-machine direction by incremental stretching.

4. The method of claim 1, wherein the multilayer film has been activated in the cross-machine direction by diverging disks.

5. The method of claim 1, wherein the stretch ratio of the multilayer film during activation in the cross-machine direction was 2:1 to 5:1.

6. The method of claim 1, wherein the multilayer film is stretched in the machine direction by differential speed rolls.

7. The method of claim 1, wherein the multilayer film is colored and/or contains a print pattern.

8. The method of claim 1, wherein the web layer is a nonwoven layer.

9. The method of claim 1, further providing a second web layer that is laminated to the multilayer film while it is stretched in the machine direction, where the multilayer film is sandwiched between the two web layers.

10. The method of claim 1, wherein the web layer is laminated to the multilayer film by adhesive bonding, thermal bonding, point bonding, ultrasonic welding or combinations thereof.

11. The method of claim 1, wherein the web layer is laminated to the multilayer film by ultrasonic welding.

12. The method of claim 8, further providing a second nonwoven layer that is laminated to the multilayer film while it is stretched in the machine direction, where the multilayer film is sandwiched between the two nonwoven layers.

13. The method of claim 12, wherein each of the nonwoven layers has a different basis weight.

14. The method of claim 12, wherein the nonwoven layers are laminated to the multilayer film by ultrasonic welding.

15. The method of claim 14, wherein the multilayer film is apertured but the nonwoven layers are not.

16. The method of claim 14, wherein the multilayer film and nonwoven layers are apertured.

17. The method of claim 1, wherein the core:skin ratio of the multilayer film prior to activating the multilayer film in the cross-machine direction is at least 2:1.

18. The method of claim 1, wherein the core:skin ratio of the multilayer film prior to activating the multilayer film in the cross-machine direction is at least 3:1.

19. The method of claim 1, wherein the elastomeric core layer is a styrenic block copolymer and the skin layers are each a polyolefin.

20. The method of claim 1, wherein the elastomeric core layer is a SIS and polystyrene blend and the skin layers are a polypropylene and polyethylene blend.

21. The method of claim 1, wherein the elastomeric core layer is a SIS and polystyrene blend and the skin layers are polypropylene.

22. The method of claim 1, wherein the multilayer film provided for stretching would require a force of at least 2.5 N to stretch a 25.4 mm wide sample 10% in the machine direction.

23. The method of claim 1, wherein the multilayer film provided for stretching would require a force of about 5 N to 10 N to stretch a 25.4 mm wide sample 10% in the machine direction.

24. The method of claim 1, wherein activation of the film in the cross-machine direction reduces % neck-in of the film during stretching in the machine direction by at least 1%.

25. The method of claim 1, wherein activation of the film in the cross-machine direction reduces % neck-in of the film during stretching in the machine direction by at least 5%.

26. The method of claim 1, wherein the extensible web laminate is incorporated into a personal care article.

* * * * *